Aug. 15, 1939.   A. DE MARTILE   2,169,230
RECORDING SPEEDOMETER
Filed Aug. 6, 1937   2 Sheets-Sheet 1
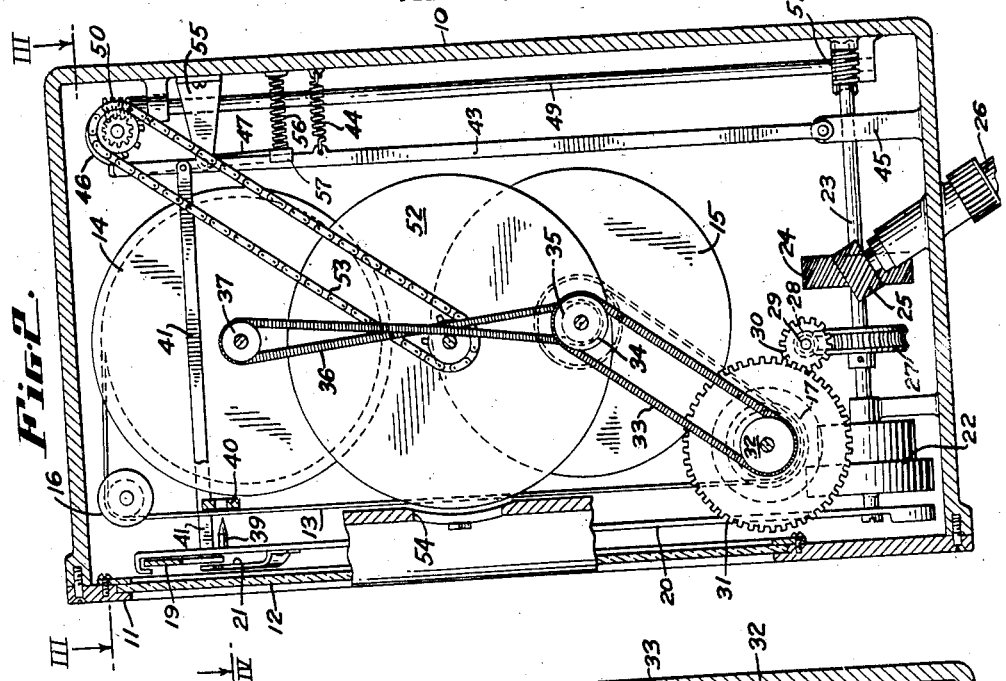
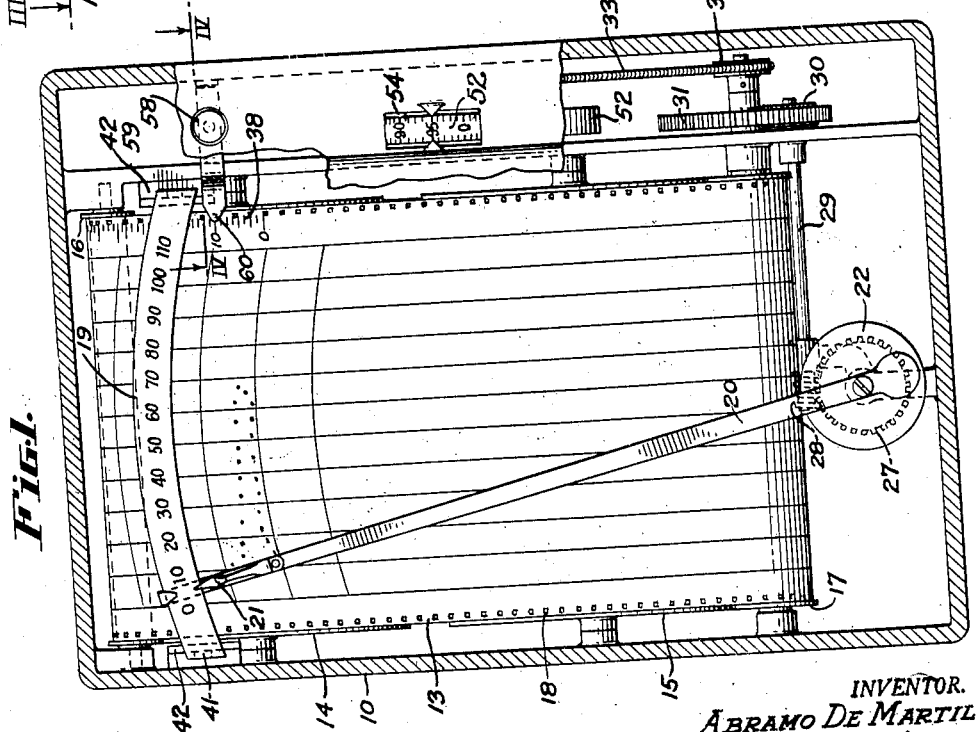
INVENTOR.
ABRAMO DE MARTILE
BY
ATTORNEYS.

Aug. 15, 1939.   A. DE MARTILE   2,169,230
RECORDING SPEEDOMETER
Filed Aug. 6, 1937   2 Sheets-Sheet 2
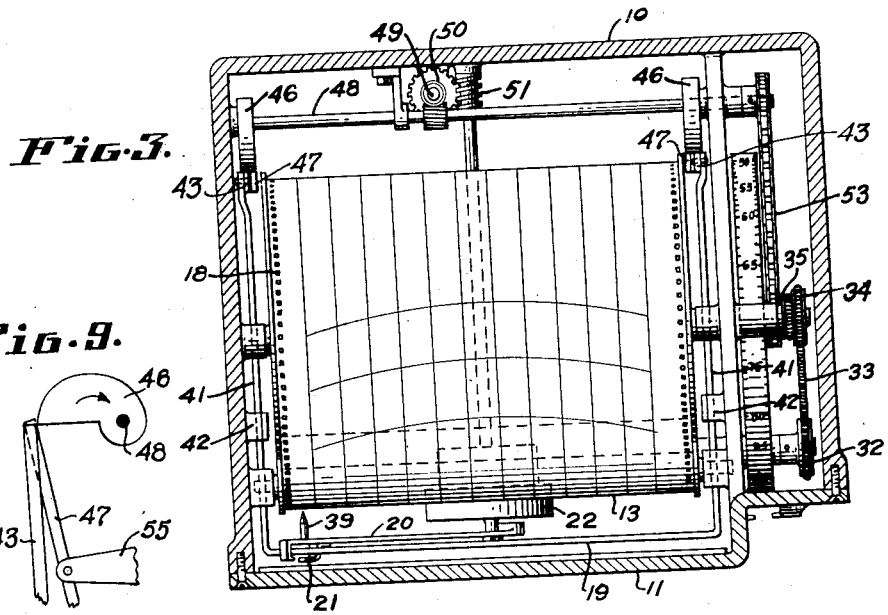
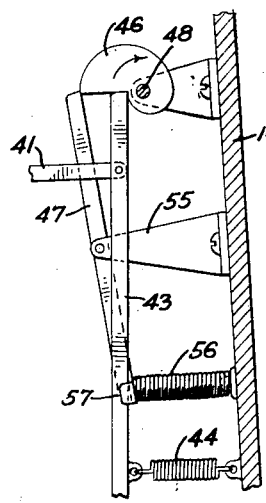
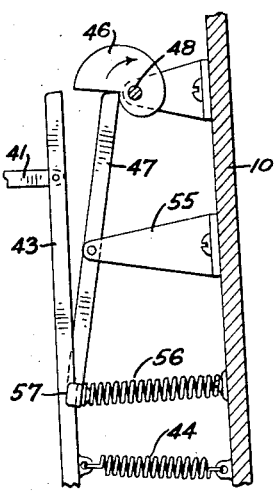
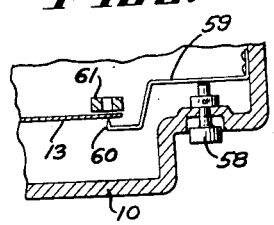
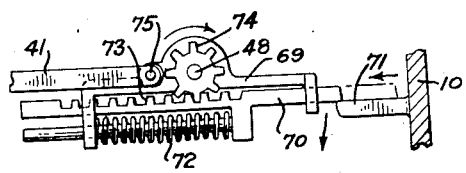
INVENTOR.
ABRAMO DE MARTILE
BY
ATTORNEY.

Patented Aug. 15, 1939

2,169,230

UNITED STATES PATENT OFFICE 2,169,230

RECORDING SPEEDOMETER

Abramo De Martile, Crockett, Calif.

Application August 6, 1937, Serial No. 157,717

7 Claims. (Cl. 234—33)

The present invention relates to recording instruments and more particularly to a recording speedometer in which a traveling chart is periodically perforated to make a permanent record of the velocities attained by the vehicle at any particular time during a recorded distance of travel.

An object of the invention is to provide a new and novel form of recording speedometer in which a moving chart is associated with a speed indicating pointer in a manner which will permit a periodic recording upon the chart of the velocities attained by the vehicle at particular points within the distance traveled.

A further object of the invention is to provide in a recording speedometer of the type having means for periodically recording velocities attained by the vehicle, an additional means which will indicate the distance traveled by the vehicle after the last velocity recording has been made upon the chart.

Another object of the invention is to provide a novel means for a recording speedometer of the type employing a moving record receiving chart by which the chart may be conveniently marked at the start and finish of a particular trip to provide for an association of the recordings upon the chart with a definite distance of travel.

Another object of the invention is to provide a new and novel form of quick acting mechanism for operating a chart perforating needle in a recording instrument of the type employing a moving chart which is periodically perforated to provide a record.

Other objects and advantages will be in part evident to those skilled in the art to which this invention appertains, and will be in part pointed out hereinafter in connection with the accompanying drawings, wherein there is shown by way of illustration and not of limitation, preferred embodiments of the invention.

In the drawings:

Figure 1 is a front view partially in section and with portions of the cover broken away to disclose the arrangement of the elements, Figure 2 is a vertical side view in section and with parts broken away to disclose the internal mechanism of the device, Figure 3 is a plan view partially in section taken along line III—III of Figure 2, Figures 4 and 5 are fragmentary views showing in detail two positions of a form of mechanism for producing a quick perforating action of the chart perforating means, Figure 6 is a fragmentary sectional view taken along line IV—IV of Figure 1, looking in direction of arrows, Figures 7 and 8 show two different forms of a quick action producing mechanism for operating the chart perforating means of the recording instrument, and Figure 9 is a fragmentary view showing the initial position of the parts illustrated in Figures 4 and 5 of the drawings.

In the embodiment of the invention illustrated in the accompanying drawings the various elements of the device are mounted within an enclosing housing 10. The front of the housing 10 has a cover 11 with an opening in which a glass 12 is secured and through which approximately one hundred miles of recordings upon a movable record receiving chart 13 are visible. The record receiving chart 13 is adapted to be unwound from a supply spool 14 and wound upon a second spool 15 when the device is in operation. As shown, the chart is carried from the spool 14 over a guide roller 16 and downwardly in a vertical plane over a second guide roller 17 upon which there are formed projections 18 that engage corresponding perforations in the edge of the chart 13. The guiding roller 17 is adapted to be driven in a continuous manner when the vehicle with which the device is used is in operation, and as a result the chart 13 will move in synchronism with the vehicle. Disposed over the upper end of the chart 13 there is a graduation carrying dial 19 graduated in terms of miles per hour. Associated with the dial 19 there is a movable arm 20 which carries a pointer 21 that serves to locate a reading upon the dial. The movable arm 20 is pivotally mounted centrally of and at the lower end of the chart 13, so that its free end will move in an arc over the chart 13 and beneath the graduation carrying dial 19. The movement of the arm 20 is here shown as controlled by a speed responsive mechanism 22 that may be of any particular type which will move the arm 20 a distance corresponding to the speed of the vehicle.

As shown in Figure 2 of the drawings, the speed responsive mechanism 22 is arranged to be driven by a centrally disposed shaft 23 that is adapted to be driven in a continuous manner through worm gears 24 and 25 from a flexible shaft 26 which is connected to an axle or other moving part of the vehicle, in accordance with standard practice. In this arrangement, however, there will be provided at some point along the drive shaft 26, a one-way ratchet device or a slipping clutch arrangement that will prevent a driving of the shaft 23 of the recording speedometer in any but a forward direction. Mounted upon the speedometer shaft 23 there is a worm wheel 27 which meshes with a worm 28 carried by a shaft 29, and at the outer end of the shaft 29 there is a gear 30 that meshes with a larger gear 31 carried by the chart guiding roller 17. This arrangement insures a constant movement of the chart 13 whenever the vehicle with which the device is used is in forward motion. Disposed outwardly from the gear 31 there is a V-pulley 32 over which a coiled spring belt 33 is disposed. The spring belt 33 extends around a second V-pulley 34 attached to the end of the chart take-up spool 15, and adjacent the V-pulley 34 there is a third smaller V-pulley 35 about which a second coiled spring belt 36 is disposed. This spring belt 36 is crossed and extends in its crossed condition about another V-pulley 37 upon the chart carrying spool 14. The use of the coiled spring belts 33 and 36 in this particular arrangement provides a slipping drive for the spools 14 and 15, and by the reversal of the spring belt 36, as shown, the movable chart 13 will be maintained taut between the guide rollers 16 and 17, irrespective of the diameter of the roll from which or upon which the chart 13 is being wound. At this point it should be noted that the V-pulleys 35 and 37, about which the spring belt 36 extends, are smaller in diameter than the V-pulleys 32 and 34, about which the spring belt 33 extends. This will cause a slippage of the belt 36 at a lower load value than that at which the spring belt 33 will slip, and thus insure a positive movement of the chart 13 when the vehicle is in motion.

Before continuing with a description of the chart perforating feature of the present invention, reference is again made to Figure 1 of the drawings, wherein it will be seen that the chart 13, in addition to having vertically extending lines that coincide with the velocity graduations upon the movable dial 19, also has graduations 38 which correspond to miles of travel of the vehicle. As a result, when the chart 13 has been perforated, as contemplated by the invention, it will be possible, at various points along the traveled distance indicated by the chart 13, to determine what the speed of the vehicle was at any particular point along the trip where a perforation is formed in the chart.

The chart perforating feature of the invention, as shown in Figures 1, 2 and 3 of the drawings, will now be described. In the arrangement illustrated, the movable arm 20 carries a chart perforating pin 39 which, in cooperation with a punch plate 40 disposed beneath the chart 13, will perforate the chart whenever the arm 20 is depressed or moved toward the chart. The chart perforating movement of the perforating pin 39 may be obtained in a number of different ways. In the present instance, since the movable arm 20 is of considerable length and sufficiently flexible to permit a depression thereof without interfering with its normal operation, I have, in accordance with this disclosure, mounted the dial 19 so that it may be moved toward the chart 13 at predetermined intervals. A movement of the dial 19 will then, because of its overlapping relation, flex the arm 20 and cause the pin 39 to perforate the chart. This is accomplished by attaching each end of the dial plate 19 to a rearwardly extending arm or link 41 which is slideably mounted in a guide 42. The arms or links 41 are then connected with any suitable snap action producing mechanism which will periodically cause these arms or links 41 to be quickly drawn in and released.

In accordance with a preferred embodiment of the invention, the links 41 are connected at their rear ends with vertically disposed levers 43 that are biased in a right-hand direction, as viewed in Figure 2, by a tension spring 44. Each lever 43 is pivotally mounted at its lower end upon a support 45, and the spring 44 is connected between an intermediate point of the lever 43 and the back wall of the housing 10. At the upper end of each lever 43 there is a continuously rotating cam 46 which, in cooperation with a second lever 47, operates in a novel way to produce a quick snap-like reciprocation of the dial plate 19, as will be hereinafter pointed out. The cams 46 are shown as mounted upon a horizontally disposed shaft 48 that is continuously driven by a vertical shaft 49 and a worm and gear connection 50 between these shafts. At the lower end of the vertical shaft 49 there is a second worm and gear driving connection 51 which connects this latter shaft with the drive shaft 23 of the recording speedometer.

When the recording speedometer is in operation, it will be seen that the moving chart 13 will be periodically perforated at points corresponding to a definite point of travel by the vehicle with which it is used. For example, by a proper driving connection between the vehicle and the perforating mechanism, the chart 13 may be perforated at the end of each one hundred feet of travel of the vehicle, as would be a preferred arrangement for vehicles used in congested districts, or the chart may be perforated at the end of each one hundred yards of travel or at greater distances where the vehicle is operating on the open highway. Since the purpose of this recording instrument is to provide a means for checking the velocities attained on a trip, and in emergencies may be resorted to for the purpose of determining just what the speed of the vehicle was at the time of an emergency, the invention also contemplates a further advantageous feature which will provide an indication of the distance traveled by the vehicle from the last perforation upon the chart 13 to a subsequent stopping of the vehicle. For this purpose the device is provided with an indicating drum 52 which is driven by a direct 1:1 ratio chain and sprocket connection 53 from the shaft 48. With this form of driving connection it will be seen that the drum 52 will make one complete revolution for each revolution of the perforator actuating cam 46. Therefore by providing a graduated scale in terms of feet or yards about the periphery of the drum 52 it will be possible, by viewing the periphery of the drum through an aperture 54 upon the housing 10, as shown in Figure 1 of the drawings, to determine just how many feet or yards the vehicle has traveled since the last perforation was made upon the chart 13, or if desired, to determine how many more feet or yards the vehicle will travel before the next velocity recording will be made upon the chart 13. As illustrated in this figure of the drawings, the device is shown as indicating that the vehicle has traveled ninety-five feet or yards from the point at which the last velocity recording was made upon the chart, and that a subsequent recording will be made upon the chart when the zero upon the drum 52 reaches the indicating position at the center of the opening 54. In this showing it is assumed that the drum 52 is adapted to cooperate with a chart perforating mechanism that operates at the end of every one hundred feet or yards of travel, and as a result, it will be equally divided about its periphery into one hundred graduations.

Reference is now made to Figures 4, 5 and 9 of the drawings for a detailed description of the arrangement and manner in which the levers 43 and 47 cooperate with the cam 46 to produce the above described quick or snap action of the chart perforating needle 39. In these figures of the drawings it will be noted that the second lever 47 is pivotally mounted intermediate its ends upon a support 55 closely adjacent the cam 46, and has a downwardly extending end against which a compression spring 56 exerts a pressure to maintain the upper end of the lever 47 in engagement with the surface of the cam 46. An important feature of the levers 43 and 47 is that the latter lever extends slightly beyond the end of the lever 43, so that as the cam 46 rotates in a clockwise direction, the lever 43 will be released in advance of a release of the lever 47 and permit the lever 43 to assume the position illustrated in Figure 4 of the drawings. At this point the compression spring 56, which operates upon the second lever 47, will be fully compressed. After the cam 46 has moved a further distance sufficient to release the second lever 47, as shown in Figure 5 of the drawings, the second lever 47 will be likewise released, and as a result, the compression spring 56, which is more powerful than the spring 44, will overcome the latter spring, and by virtue of an interlocking connection, provided between the levers 43 and 47, by the projection 57 upon the lever 47, the spring 56 will move the lever 43 back into its original inoperative position. When the lever 43 drops off the high point of the cam 46, as shown in Figure 4 of the drawings it will be understood that the dial plate 19 will be drawn inwardly with a quick snap-like movement and cause the pin 39 to perforate the chart. This quick snap-like movement of the lever 43 will be followed closely by a similar movement of the lever 47, and as a result the perforating pin 39 will be quickly withdrawn without interfering with the normal movement of the chart.

In Figure 6 of the drawings there is illustrated in detail a further feature of the invention, which is provided for the purpose of associating the velocity recordations upon the chart 13 with a definite point during any particular trip. For this purpose there is mounted at a convenient point upon the front of the housing 10 a manually operable push button 58, by means of which the edge of the chart 13 may be punched or perforated at the beginning and end of any particular trip. As shown, this is accomplished in a simple manner by associating the push button 58 with a flexible spring member 59 having an overhanging end upon which there is formed a chart perforating projection 60. The chart perforating projection 60 is shown in this figure of the drawings as disposed over a punch plate 61, which will serve to hold the chart at this point when the perforation is made in the chart.

While there has been described above a preferred form of actuating mechanism for producing a quick or snap-like action of the chart perforating pin 39, it will be understood that this action may be accomplished in other ways without departing from the spirit of this invention.

In Figure 7 of the drawings there is shown a modified form of snap action producing mechanism that may also be associated with the links 41 which connect with the ends of the dial plate 19. In this modification the link 41 is connected to a pivoted lever 62 which is mounted intermediate its ends upon a pivot 63. The lower end of the lever 62 has an impact flange or shoe 64 against which an impact producing weight 65 may periodically strike. The impact weight 65 is shown as mounted eccentrically upon a disk 66 carried by the shaft 48, and it is biased into a position outwardly from the periphery of the disk 66 by a spring 67. Surrounding the major portion of the disk 66, and in the path of the impact weight 65, there is a stationary flange or retaining member 68 that retracts the weight 65 to recoil the spring 67. The retaining member 68 is open adjacent the lower end of the lever 62, and as a result, the impact weight 65 will be released at this point during each revolution of the disk 66 and strike the impact shoe 64 upon the lever 62, and thus move the upper end of this lever to the right and cause the link 41 to move the dial plate 19, as above described.

In Figure 8 of the drawings there is shown a further modification of a quick acting mechanism that may be resorted to for the purpose of producing a reciprocating motion of the links 41 to accomplish a perforation of the chart 13 in a manner similar to that described above. In this arrangement, like in the previously described embodiments, the shaft 48 is used to drive the mechanism. This mechanism comprises a member 69 that is rotatably mounted upon and adjacent an end of the shaft 48. The member 69 carries a slidable latch member 70 which, when extended with respect to the shaft 48, will engage a stationary abutment 71 formed upon the enclosing housing 10. The latch member 70 is adapted to be biased toward the abutment 71 by means of a compression spring 72, and along one side thereof it has a rack section 73 with which a gear 74 secured upon the end of the shaft 48 will cooperate. In addition to slidably supporting the latch member 70 and the spring 72 the member 69 also has a crank 75 that is disposed outwardly beyond the end of the shaft 48 to which one of the links 41 is adapted to be connected. As shown in this figure of the drawings, the latch member 70 has been moved to the left and is about to disengage the abutment 71. This movement of the latch member 70, it will be understood, has been accomplished by a rotation of the gear 74 which, as shown, engages the rack 73 upon the latch 70. During this movement of the latch member 70 the spring 72 will be compressed, and as a result, it will become operative immediately upon disengagement between the extending end of the latch 70 and the abutment 71 to project the latch member 70 outwardly, but in so doing, because of the relatively slower movement of the gear 74, the rack 73 will move relative to the gear 74 and carry the member 69 around the shaft 48 in a clockwise direction and into a position where the extending end of the latch member 70 will again engage the abutment 71, as shown by dot and dash lines in the drawings, after which the latch 70 will be slowly moved to the left by the continued rotation of the gear 74 upon the shaft 48 and again disengaged with the abutment 71, as above described, for a repetition of the above action.

During the above rotation of the member 69 it will be seen that, because of the eccentricity of the crank 75, the link 41 will be given a reciprocating movement, first to the right and then to the left, as illustrated, and when the links 41 are connected to the dial plate 19, as described above, it will be seen that the dial plate will be likewise reciprocated, and thus deflect the arm 20 and cause the pin 39 to perforate the chart 13 in a quick acting manner.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. A combined indicating and recording speedometer comprising in combination a record receiving chart driven in proportion to the travel of a vehicle, a speed indicating pointer mounted to swing across said chart, a chart perforating means carried by said pointer, a speed indicating dial plate movable periodically to cause said means to perforate said chart, means controlling the movement of said dial plate comprising a continuously rotating cam having an abrupt point of release thereupon, a lever associated with said cam and connected with said dial plate, a spring operable upon said lever to bias same against said cam in a perforator operating direction, a second lever pivotally mounted intermediate its ends and biased into engagement with said cam by a more powerful spring operating in a direction opposite to that of said first spring, said second lever being slightly longer than said first lever, whereby a release of said first lever will occur prior to a release of said second lever, and a cooperating connection between said two levers adapted to move said first lever against the action of said first spring immediately upon release of said second lever by said cam.

2. In a recording speedometer of the character described, the combination of a movable chart driven in proportion to the travel of a vehicle, a perforating pin movable over said chart in response to the speed of the vehicle, means cooperating with said pin adapted to move said pin into perforating relation with the chart, a pivotally mounted lever connected to said means, a spring for biasing said lever for movement in a direction to perforate said chart, a cam adapted to engage the end of said lever for retaining same in an inoperative position, and also permit the same to move in response to said bias at a predetermined point during a revolution of said cam, a second pivotally mounted lever adjacent said first lever also engaging said cam with its end in cam engaging relation with the end of said first lever, a spring means for biasing the trailing end of said second lever into engagement with said cam, said second spring being more powerful and operable in a direction opposite to that of said first spring and being adapted upon a release of said second lever by said cam to move said first lever into its inoperative position with respect to said chart perforating means substantially as described.

3. In a chart perforating attachment for recording speedometers of the character described, the combination of a movable chart driven in proportion to the travel of a vehicle, a pointer having a chart perforating pin movable over said chart in response to the speed of the vehicle, means associated with said pointer adapted to move said pin into perforating relation with the chart irrespective of the position of said pointer upon said chart, a pivotally mounted lever connected adjacent its free end to said means, a spring for biasing said lever and means for movement in a direction to perforate said chart, a cam engaging the end of said lever for retaining same in an inoperative position and permitting the same to move in response to said bias at a predetermined point during each revolution of said cam, a second lever extending adjacent said first lever having one end engaging said cam in trailing relation with said first lever pivotally mounted adjacent said cam and having an oppositely extending end, a compression spring engaging the oppositely extending end of said second lever for biasing its cam engaging end into engagement with said cam, said second spring being more powerful than said first spring and being adapted upon a release of said second lever by said cam to engage and move said first lever into an inoperative position.

4. In a combined indicating and recording speedometer, the combination of a record receiving chart adapted to be driven in synchronism with the travel of a vehicle, a speed responsive device having an indicating pointer adapted to swing transversely across said moving record receiving chart, said chart having mileage indicating graduations arranged along one edge thereof and having graduations corresponding to velocity extending in the direction of travel of said chart, a dial plate having velocity indicating indicia thereupon disposed in front of said chart and with which the pointer of said speed responsive device cooperates to indicate the velocity of the vehicle at any particular mileage point in the travel of the vehicle, said velocity indicating dial being mounted for movement toward said chart, chart perforating means carried by said pointer and movable to perforate said chart when said velocity indicating dial is moved toward said chart, a cam operated mechanism driven in synchronism with said chart having a cam engaging lever connected to said velocity indicating dial plate to cause said dial plate to periodically move toward said chart to effect a perforation thereof to record upon said chart the velocity obtaining at that time, and a second lever associated with said first lever also cooperating with said cam and operating to move said first lever out of engagement with said cam to prevent the chart perforating means from interfering with the normal movement of said record receiving chart.

5. In a combined indicating and recording speedometer, in combination, a record receiving chart adapted to be driven in proportion to the travel of a vehicle, a speed responsive device having an indicating pointer adapted to swing across said moving chart, said chart having mileage indicating graduations arranged along one edge thereof and having graduations corresponding to velocity extending in the direction of travel of the chart, an arcuate dial plate having velocity indicating indicia thereon disposed in front of said chart and parallel therewith and cooperating with said pointer to indicate the velocity of said vehicle at any particular point in the travel of the vehicle, said dial plate being mounted for movement toward and from said chart, chart perforating means carried by said pointer and movable to perforate said chart when said dial plate is moved toward said chart, a pair of identical cams driven in proportion to the movement of the chart for controlling the movement of said dial plate with respect to said chart, each cam having a cam engaging lever connected to said dial plate to cause said plate to move periodically toward said chart to effect a perforation thereof, each cam having a second lever cooperating with said first lever to move said first lever out of engagement with said cam to move said chart perforating means away from said chart.

6. A combined indicating and recording speedometer mechanism, including in combination, a record receiving chart adapted to be driven in proportion to the travel of a vehicle, a speed responsive indicating pointer mounted to swing transversely across the chart, said chart having mileage indicating graduations along one edge thereof and having graduations corresponding to velocity extending in the direction of travel of the chart, a dial plate having velocity indicating indicia thereon, extending across the front of the chart and cooperating with said pointer, chart perforating means carried by said pointer and movable by said plate to perforate said chart, a casing enclosing said mechanism, a pair of levers pivoted near the bottom of said casing and extending upwardly above said dial plate and attached thereto for moving said plate toward and from said chart, a second pair of levers pivoted adjacent the upper part of said casing and cooperating with said first levers, a pair of identical cams driven in proportion to the travel of said chart, each cam cooperating with one of the first-mentioned levers to move the dial plate toward the chart to perforate the chart and also cooperating with one of the second pair of levers to move the dial plate away from said chart.

7. The combination claimed in claim 4 in which the first lever is provided with a spring to bias said lever in engagement with said cam and in which said second lever is provided with a spring to bias said second lever towards said cam and to move said first lever away from said cam.

ABRAMO DE MARTILE.